(No Model.) 3 Sheets—Sheet 1.

J. J. GERARD.
DUST COLLECTOR.

No. 364,099. Patented May 31, 1887.

Witnesses
R. H. Sanford.
A. T. Page.

Inventor
John J. Gerard.
By A. O. Paul
Atty.

(No Model.)  J. J. GERARD.  3 Sheets—Sheet 2.
DUST COLLECTOR.

No. 364,099.   Patented May 31, 1887.

(No Model.) 3 Sheets—Sheet 3.

J. J. GERARD.
DUST COLLECTOR.

No. 364,099. Patented May 31, 1887.

Witnesses
R. H. Sanford.
A. T. Page.

Inventor
John J. Gerard,
By R C Paul
atty

UNITED STATES PATENT OFFICE.

JOHN J. GERARD, OF MINNEAPOLIS, MINNESOTA, ASSIGNOR TO FERDINAND SCHLESINGER, OF MILWAUKEE, WISCONSIN.

DUST-COLLECTOR.

SPECIFICATION forming part of Letters Patent No. 364,099, dated May 31, 1887.

Application filed June 23, 1886. Serial No. 206,398. (No model.)

*To all whom it may concern:*

Be it known that I, JOHN J. GERARD, of Minneapolis, in the county of Hennepin and State of Minnesota, have invented certain new and useful Improvements in Dust-Collectors, of which the following is a specification.

This invention relates to improvements in dust-collectors that are used in connection with middlings-purifiers, grain-cleaners, and other dust-producing machines. The purpose and operation of these machines are well understood in the art.

The object of my invention is to simplify the construction, and thereby reduce the cost, of such machines, and also to provide efficient means for removing the adhering dust from the dust-detaining medium.

To these ends the invention consists, generally, in a dust-collector having a dust-detaining medium against which a current of dust-laden air is carried, and means which travels over said medium and directs a reverse current of air through it, thereby removing the adhering dust.

The invention consists, further, in the constructions and combinations of parts, hereinafter described, and pointed out in the claims.

Figure 1:
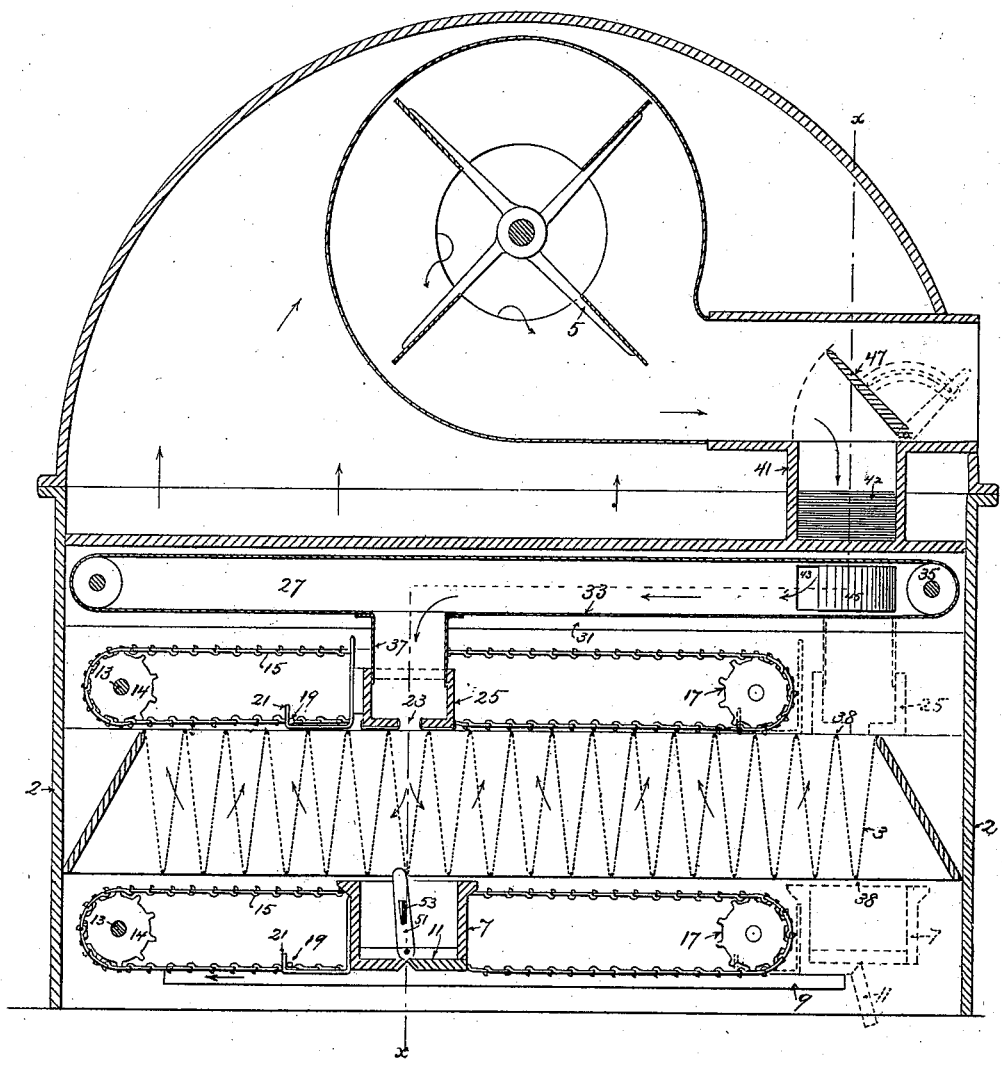
Figure 2:
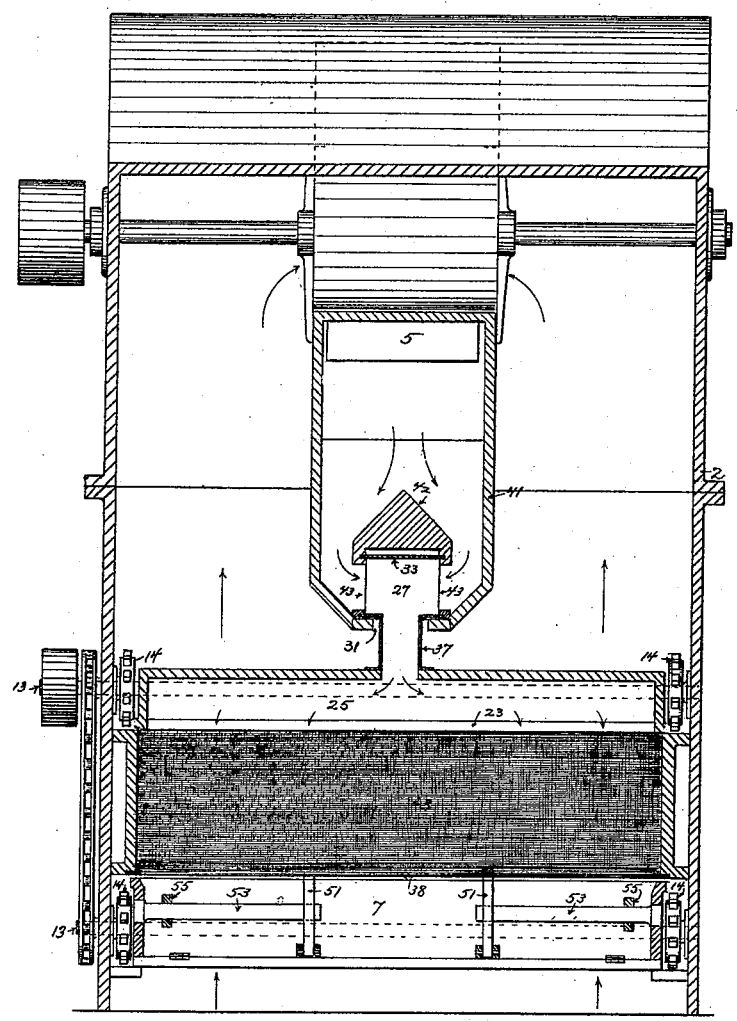
Figure 3:
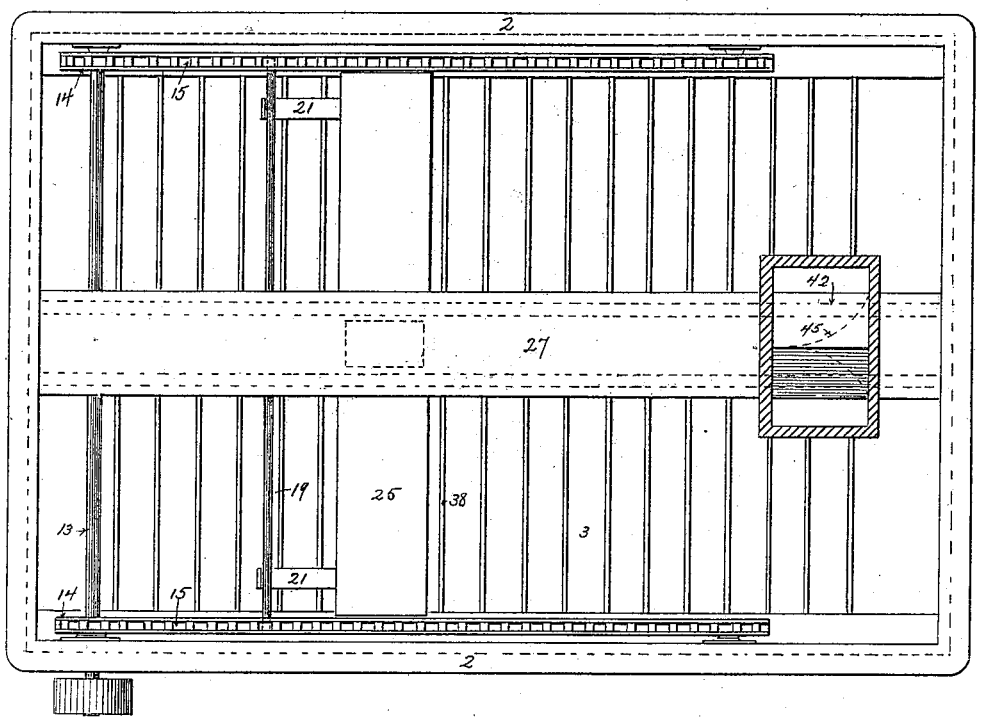
Figure 4:
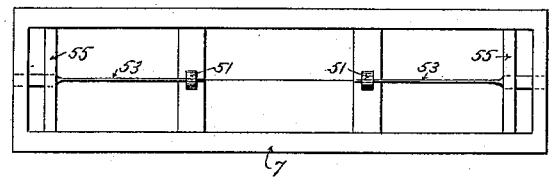

In the drawings forming part of this specification, Figure 1 is a vertical section of a dust-collector constructed in accordance with my invention. Fig. 2 is a vertical section on line X X of Fig. 1. Fig. 3 is a sectional plan of the dust-collector with the upper portion of the casing removed. Fig. 4 is a plan of the reciprocating tray.

In the drawings, 2 represents the casing, which may be of any preferred form or construction. I prefer to make the casing in two sections, the upper being removable and supporting the fan, and the lower containing the dust-detaining medium and the means for removing the dust therefrom.

Within the casing is a dust-detaining medium, 3, against which a current of dust-laden air is directed. This medium is preferably composed of flannel cloth, though other suitable material may be used in place thereof. I prefer to arrange this cloth in a zigzag line extending across the casing, as thereby a greater dust-collecting surface is presented to the dust-laden air-current.

The bottom of the casing 2 is open, or an opening is formed in the wall below the cloth, through which the dust-laden air is led into the casing.

In the upper portion of the casing is a suitable fan, 5, by which the dust-laden air is drawn to the collecting medium. The dust adheres to the medium, while the clear air is removed by the fan. Beneath the cloth is a traveling receptacle or tray, into which the dust falls as it is dislodged from the cloth, and above the cloth is a traveling trunk or conductor, by which a reverse current of air is directed against the cloth to blow the dust therefrom.

The construction of dust-tray that I prefer to employ, and the means that I prefer to use for reciprocating it, are substantially as follows: The tray consists of an open box, 7, that is supported upon horizontal rails or bars 9. The bottom of the tray is provided with a hinged valve, 11, that is adapted to open by gravity as soon as it passes off the rails 9. The tray travels in one direction until the valve in the bottom is beyond the rails 9, when it opens, as indicated by dotted lines in Fig. 1, and the dust or material collected in the tray falls into a suitable discharge. Two shafts, 13, are mounted in the casing, one above and the other below the cloth and at one end thereof. Power is applied to one of these shafts, and through it and suitable connecting means to the other. Sprocket-wheels 14 are provided for each shaft. Drive chains 15 pass over these sprocket-wheels and over idler sprocket-wheels 17 near the other end of the cloth. A horizontal rod, 19, is secured to the lower chains and extends across from one to the other. To the tray 7 are secured the L-shaped bars 21, whose short arms project above the lower portions of the chains. The rod 19 engages with the short arms of the bars 21, as shown in Figs. 1 and 3, and as the chains travel in the direction indicated by the arrow in Fig. 1 the tray moves with them. When the portions of the chains to which the rod 19 is attached move upward around the sprocket-wheel, the rod 19 is disengaged from the bars 21, and the tray remains stationary until in the course of its travel the rod encounters the long arms of the bars, or the tray itself, and moves it in the opposite direction. This is continued until the tray arrives at the point indicated by the dotted lines in Fig. 1. The rod 19 then leaves it and soon engages the short arm of the bar 21 again, and reverses the movement of the tray. The chain is moved continuously by the sprocket-wheels and reciprocates the tray beneath the cloth. I do not, however, confine myself to this means for reciprocating the tray, as any suitable means for producing a reciprocating motion thereof may be employed instead. Above the cloth is a reciprocating trunk or air-conductor, 25, that extends across the cloth and has one or more slots or perforations, 23, in its bottom, but is otherwise closed.

The trunk 25 slides upon suitable rails, and its bottom is substantially flush with the upper angles of the zigzag cloth. The bottom of the trunk is preferably padded, so that the air will not escape between it and the cloth.

Any suitable means may be used to reciprocate the trunk 25. I prefer, however, to provide it with L-shaped bars 21, similar to those on the tray 7, and to use means for engaging these bars and moving the trunk, that are also similar to those used for moving the tray. The trunk over the cloth and the tray beneath it are thereby moved in unison, and the trunk is at all times directly over the tray.

I provide suitable connecting means between the exit side of the fan and the trunk 25 for conducting a blast of air from the fan into this trunk, and thus creating a reverse current through the dust-detaining medium. The means that I prefer to use for this purpose are substantially of the following description:

An air-trunk, 27, is arranged lengthwise of the machine, preferably above the trunk or conductor 25. This trunk has a slot, 31, through its lower wall, the length of this slot being substantially equal to the distance that the trunk 25 travels. Arranged within the trunk 27, and extending substantially the full length thereof, is a belt, 33, that is supported upon pulleys 35. The lower part of the belt lies directly over the bottom wall of the trunk and covers the slot therein. An opening is formed through the belt, and a tube, 37, secured to the belt extends through the slot in the trunk 27 and connects with the conductor 25 through an opening in its top. The edges of the belt preferably travel in grooves formed in the side walls of the trunk. An air-conductor, 41, extends from the exit-spout of the fan to the trunk 27. The trunk is provided with openings 43, preferably in its side walls, and the conductor 41 extends below these openings on each side of the trunk. An inverted-V-shaped deflector, 42, may be arranged over the trunk 27 to divide the current and direct it into the openings in its side walls. Curved deflectors 45 may be placed in the trunk opposite the openings to direct the current lengthwise of the trunk.

A hinged valve, 47, is arranged in the exit-spout of the fan, by which the current that is directed into the trunk may be regulated. This valve may be provided with suitable adjusting means located on the outside of the casing, as indicated by dotted lines in Fig. 1.

I prefer to support the dust-detaining cloth upon rods 38, that extend across the casing. These rods are arranged in two series alternating with each other, as shown in Fig. 1. The cloth is carried over one of the rods of the top series, then under the next rod of the lower series, then over the next top rod, and so on. In this way the cloth is brought into a series of V-shaped folds, with one of the rods at the angle of each fold. Other means may be used for supporting the cloth, if preferred.

In some instances I prefer to use knockers to aid in freeing the cloth from dust, and in the drawings I have shown the tray 7 provided with suitable knockers for this purpose.

The knockers 51 are pivoted in the bottom of the tray, two, preferably, being used. Spring-bars 53 are secured to the ends of the tray, pass through supporting-bars 55, and are connected with the knockers 51. The knockers are thereby normally held in an upright position, their upper ends projecting above the top of the tray, so that as the tray is moved beneath the cloth the ends of the knockers encounter the supporting-rods. The knockers are thereby turned upon their pivots against the tension of the springs until sufficiently depressed to pass under the rod, when they spring up and strike a sharp blow on the next rod, causing it to vibrate and shake the cloth. When the movement of the tray is reversed, the knockers turn in the opposite direction. Any suitable spring-knocker that will operate as the tray moves in either direction may be used.

The operation of the machine is substantially as follows: A current of dust-laden air is brought against the under surface of the cloth, and the air passes through, while the dust is detained. The air-conductor 25 is reciprocated above the cloth, a current of air is blown from the fan into this conductor and through the opening 23 against the upper surface of the cloth, and thereby forces the dust off the lower surface. The tray 7 travels beneath the cloth directly under the conductor 25 and catches the falling dust, which is discharged through the valve 11 when the tray arrives at the end of its travel. The knockers, when used, jar the cloth, and thus aid in clearing it of dust.

It will be seen that the machine is very simple, and hence can be made at a small expense, and as the traveling air-conductor continually passes over the cloth and directs a reverse current of air through every portion of it the dust is effectually removed and the cloth is kept clean and in good condition.

I prefer the zigzag arrangement of the cloth, as thereby a greater collecting-surface is presented, but do not confine myself thereto, as a straight cloth may be used instead, if preferred; nor do I confine myself to any particular form of traveling air-conductor, nor to the particular means shown for connecting the fan and this conductor, as the same may be varied without departing from my invention.

I prefer to draw the dust-laden air against the collecting medium by a fan located in the collector-casing, and to obtain the reverse current for clearing the medium from the exit side of the same fan.

A separate fan may be used for creating the reverse current, or the dust-laden air may be blown into the casing and against the medium, if preferred.

I claim as my invention—

1. The combination, in a dust-collector, of a dust-detaining medium, means for directing a current of dust-laden air against one side of said medium, and a traveling conductor directing a current of air against the opposite side of said medium, for the purpose set forth.

2. The combination, in a dust-collector, of a stationary dust-detaining medium, means for directing a current of dust-laden air against one side of said medium, and a reciprocating conductor for directing a current of air against the opposite side of said medium, for the purpose set forth.

3. The combination, in a dust-collector, of a dust-detaining medium, means for directing a current of dust-laden air against one side of said medium, a traveling air-conductor directing a current of air against the opposite side of said medium, and a traveling dust tray or receptacle for receiving the dust as it is dislodged from said medium, for the purpose set forth.

4. The combination, in a dust-collector, of a horizontally-arranged dust-detaining medium, means for directing a current of dust-laden air against the under side of said medium, a traveling air-conductor above said medium directing a current of air against its upper surface, and a dust tray or receptacle beneath said medium moving in unison with said air-conductor, for the purpose set forth.

5. The combination, in a dust-collector, of a horizontally-arranged dust-detaining medium, means for directing a current of dust-laden air against the under side of said medium, a traveling tray or receptacle beneath said medium, and means for directing a reverse current of air through the portion of said medium under which said receptacle is passing, for the purpose set forth.

6. The combination, in a dust-collector, of a zigzag dust-detaining medium, means for directing a current of dust-laden air against the under side of said medium, a reciprocating receptacle beneath said medium, and means for directing a reverse current of air through each section of said medium as the receptacle passes under it, for the purpose set forth.

7. The combination, in a dust-collector, of the zigzag dust-detaining medium, the reciprocating tray beneath said medium, and the spring-knockers on said tray, arranged to strike said medium as said tray is reciprocated beneath it, and means for directing a reverse current of air through the portion of said medium under which said receptacle is passing, for the purpose set forth.

8. The combination, in a dust-collector, of the zigzag cloth, the rods 38, supporting said cloth, the reciprocating receptacle beneath said cloth, and the spring-knockers on said receptacle, projecting above the rods and capable of yielding in either direction, whereby, as said receptacle moves in either direction, the knockers encounter the rods, are depressed thereby, and when released strike the next rod of the series, substantially as described.

9. The combination, in a dust-collector, of the zigzag dust-detaining medium, the fan arranged to draw a current of dust-laden air against said medium, the reciprocating receptacle beneath said medium, the reciprocating trunk having a slotted bottom arranged over said receptacle upon the opposite side of the medium, and an air-conductor for directing a current of air into said reciprocating trunk, for the purpose set forth.

10. The combination, in a dust-collector, of the dust-collecting medium 3, the reciprocating trunk 25, having the slotted bottom, the slotted air-trunk 27, the belt 33 in said trunk, the conductor attached to said belt and extending into the reciprocating trunk, the fan, and the air-conductor extending from said fan to said trunk, substantially as described.

11. The combination, in a dust-collector, with the movable tray 7 and the L-shaped bars 21, secured thereto, of the chains 15, the rod 19, arranged to engage said L-shaped bars, and means for moving said chains, all operating substantially as described, and for the purpose set forth.

12. The combination, in a dust-collector, with the movable trunk 25 and the L-shaped bars secured thereto, of the chains 15, the rod 19, arranged to engage said L-shaped bars, and means for moving said chains, all arranged and operating substantially as described, and for the purpose set forth.

In testimony whereof I have hereunto set my hand this 21st day of June, 1886.

JOHN J. GERARD.

In presence of—
A. C. PAUL,
R. H. SANFORD.